March 5, 1963  W. I. SEVERSON  3,080,142
GOLF CART SEAT

Filed Nov. 1, 1961  2 Sheets-Sheet 1

Wilmer I. Severson
INVENTOR.

BY *Clarence A. O'Brien*
and *Harvey B. Jacobson*
Attorneys

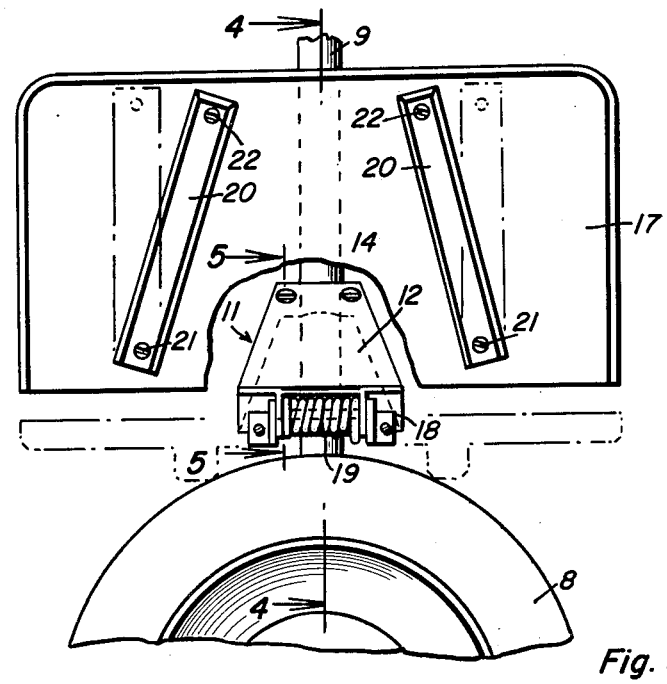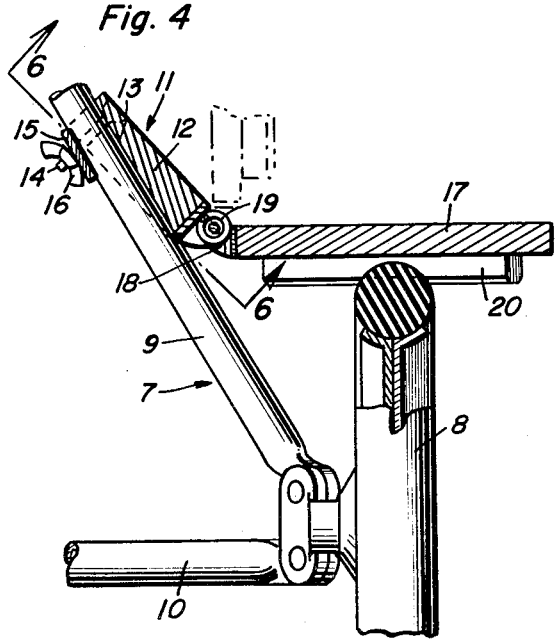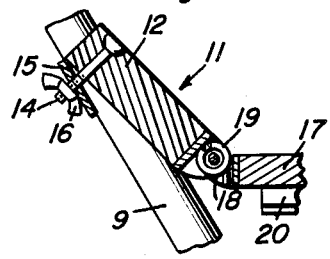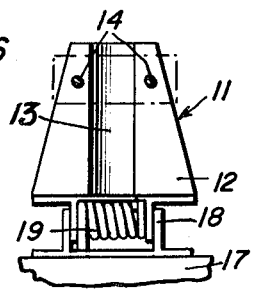
Wilmer I. Severson
INVENTOR.

3,080,142
GOLF CART SEAT
Wilmer I. Severson, 7319 28th Ave., Kenosha, Wis.
Filed Nov. 1, 1961, Ser. No. 149,404
6 Claims. (Cl. 248—121)

This invention relates to new and useful improvements in golf cart seats and has for its primary object to provide, in a manner as hereinafter set forth, a device of this character which is adapted to be expeditiously mounted for use on various makes of conventional golf bag carts without the necessity of structurally altering or modifying same.

Another very important object of the present invention is to provide a seat attachment of the character described which, when it is vacated by the user, automatically swings to an out-of-the-way folded or inoperative position.

Still another important object of the invention is to provide a folding seat attachment of the aforementioned character which, when in use, is supported by one of the usual rubber-tired wheels of the cart and which, further, is adapted to rest firmly on wheels of various diameters.

Another object of the present invention is to provide a seat of the character set forth comprising a clamp of unique construction for attaching the device to a cart.

Other objects of the invention are to provide an improved golf cart seat which will be comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a side elevational view, showing the seat in raised or folded position with a portion thereof broken away;

FIGURE 4 is a vertical sectional view, taken substantially on the line 4—4 of FIGURE 3 but with the seat in lowered position;

FIGURE 5 is a fragmentary view in vertical section on an enlarged scale, taken substantially on the line 5—5 of FIGURE 3 but again showing the seat in lowered position; and FIGURE 6 is a detail view in section through the clamp, taken substantially on the line 6—6 of FIGURE 4.

Figure 1:
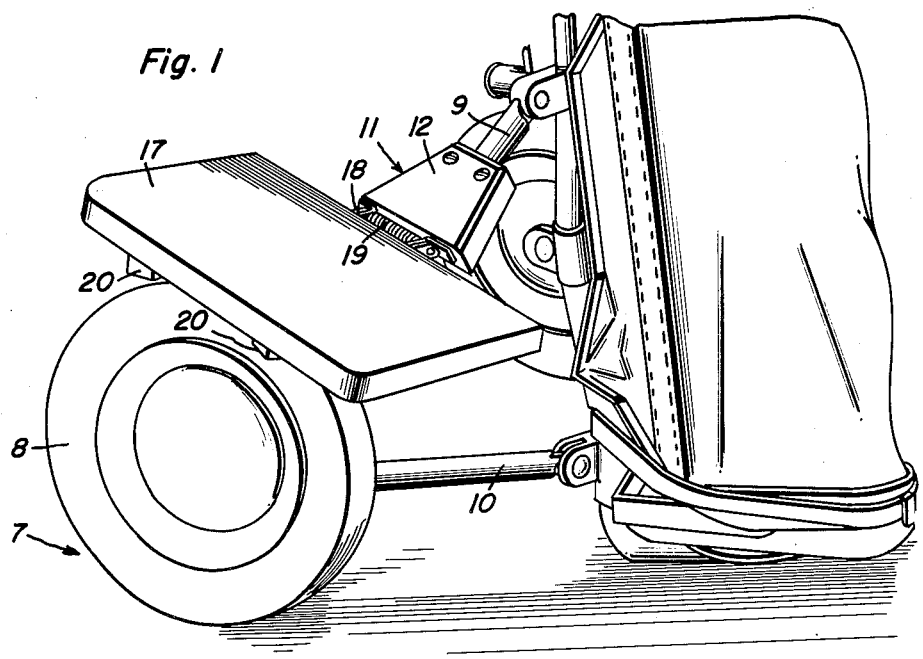
FIGURE 1 is a top perspective view, showing a seat embodying the present invention in lowered position for use on a golf cart.
Figure 2:
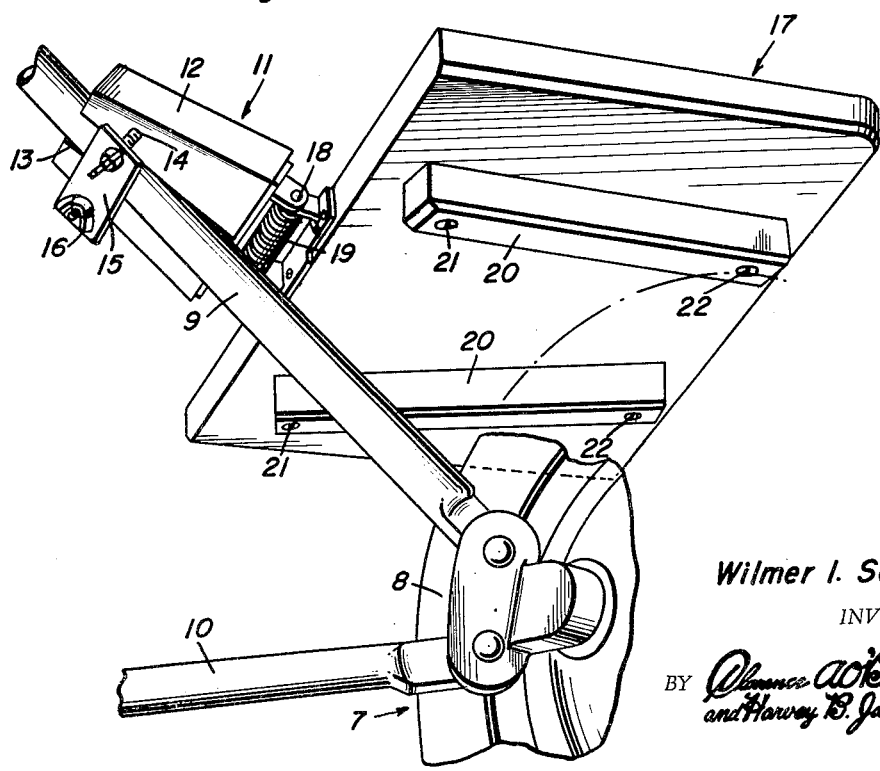
FIGURE 2 is a bottom perspective view thereof.

Referring now to the drawing in detail, it will be seen that reference character 7 generally designates a portion of a conventional golf cart. The cart 7 includes the usual rubber-tired wheels 8 rotatably mounted on suitable spindles provided therefor on the pivotally connected outer ends of vertically swingable or foldable inclined and substantially horizontal arms or struts 9 and 10, respectively.

The embodiment of the present invention which has been illustrated comprises a clamp which is designated generally by reference numeral 11. The clamp 11 is adapted to be adjustably and removably mounted on an intermediate portion of either of the inclined arms or struts 9 of the cart 7. Toward this end, the clamp 11 includes a substantially trapezoidal plate or block 12 of suitable material, preferably wood, which block may also be of any desired dimensions. The block 12 is adapted to be mounted longitudinally on the inclined struts 9 and toward this end has formed longitudinally in its lower side or face a groove or channel 13. The groove or channel 13 is arcuate to provide a seat which snugly receives the strut 9 and said groove or channel progressively decreases in depth toward the lower end of the block 12. This is shown to advantage in FIGURE 4 of the drawing. The clamp 11 further includes threaded studs or shanks 14 which project from the block 12 on opposite sides of the groove 13. A clamping bar 15 of suitable metal is mounted on the studs or shanks 14 and engaged transversely beneath the strut 9. Wing nuts 16 are threaded on the studs or shanks 14 and tighten the bar 15 on the strut 9 for securing the clamp assembly 11 in an obvious manner.

Hingedly mounted for vertical swinging movement on the lower end of the block 12 is a substantially rectangular seat 17 which, when in open or operative position for use, is adapted to rest on the adjacent wheel 8. The seat 17 may be of any desired dimensions and of any suitable material, preferably wood. A hinge 18 pivotally connects the seat 17 to the block 12 for swinging movement in a vertical plane. The hinge 18 includes a spring 19 which yieldingly urges the seat 17 upwardly toward folded or inoperative position.

Mounted beneath the seat 17 is a pair of contact bars 20 which are adapted to rest on the cart wheel 8 at circumferentially spaced points and in a manner to support said seat 17 thereon just out of contact therewith. Thus, the seat 17 is positively supported at two spaced points on the periphery of the wheel 8 and prevented from wobbling. The inner end portions of the cleats or base bars 20 are pivotally secured at 21 beneath the seat 17. In this manner the members 20 are mounted for swinging adjustment toward or away from each other beneath the seat. Then, the outer or other end portions of the members 20 are secured as at 22 beneath the seat 17.

It is thought that the use of the device will be readily apparent from a consideration of the foregoing. Briefly, the seat 17 is normally yieldingly retained in the folded or inoperative full line position of FIGURE 3 of the drawing by the spring hinge 18. To use the device the seat 17 is swung downwardly against the tension of the spring 19 in a manner to bring the elements or cleats 20 to rest on the periphery of the tire of the wheel 8. The seat 17 is easily held down with the hand by which said seat is lowered while the user takes his position thereon. The cleats 20 are preferably secured at 21 beneath the seat 17 when the device is assembled. Then, when the seat is mounted on the cart, the cleats 20 are pivotally adjusted according to the diameter of the wheel and the other end of said cleats are secured at 22. The construction and arrangement is such as to interfere in no way with the opening or closing of the cart wheels. Also, substantially all of the weight of the user is transmitted directly to the wheel through the seat 17. The construction of the clamp 11 is such as to firmly grip the strut 9 for securing the seat 17 in the desired position thereon. However, if desired, sandpaper or other suitable material may be interposed between the block 12 and the strut 9 for further securing the adjustment. The clamp 11 may be readily applied to a majority of the various makes of carts on the market. For those makes which will not accommodate the clamp 11 as shown, suitable adapters may be provided on said clamp for attachment to such carts. When properly installed and when in unfolded or operative position, the seat 17 substantially parallels the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a golf bag cart including a wheel strut and a wheel, an attachment comprising a clamp mounted on the strut, a seat, and a hinge pivotally connecting the seat to the clamp for vertical swinging movement, said seat being engageable on the wheel to be supported thereby in an operative position, said hinge including a spring for swinging the seat upwardly to an inoperative position.

2. In combination with a golf bag cart including a strut and a ground wheel, an attachment comprising a clamp assembly including a block having a groove therein seatingly receiving the strut, threaded elements on the block on opposite sides of the groove, a bar on said elements engaged transversely with the strut, nuts on the elements engaged with the bar for adjustably and removably securing the clamp assembly on the strut, a seat, and a hinge pivotally securing said seat on the block for vertical swinging movement, said seat being engageable on the wheel to be supported thereby in a substantially horizontal position.

3. For use on a golf bag cart including a strut and a ground wheel, an attachment comprising a clamp assembly including a block having a groove therein seatingly receiving the strut, threaded elements on the block on opposite sides of the groove, a bar on said elements engaged transversely with the strut, nuts on the elements engaged with the bar for adjustably and removably securing the clamp assembly on the strut, a seat, and a hinge pivotally securing said seat on the block for vertical swinging movement, said seat being engageable on the wheel to be supported thereby in a substantially horizontal position, said groove being open at both ends and progressively decreasing in depth to one end for inclining the block relative to the strut.

4. An attachment in accordance with claim 2, said hinge including a spring for swinging the seat to an inoperative position.

5. A seat attachment in accordance with claim 3, said hinge comprising a coil spring yieldingly urging the seat upwardly to an inoperative position.

6. In combination with a golf bag cart including a strut and a supporting wheel, a seat, means hingedly securing the seat for vertical swinging movement on the strut, said seat engageable on the wheel to be supported in a substantially horizontal operative position thereby, and a pair of cleats pivotally secured for swinging adjustment on the underside of the seat and engageable at circumferentially spaced points on the periphery of the wheel for providing a variable two-point suspension for the seat thereon.

References Cited in the file of this patent
UNITED STATES PATENTS

| | | |
|---|---|---|
| 127,891 | Kapple | June 11, 1872 |
| 2,772,720 | Zody | Dec. 4, 1956 |
| 2,944,593 | Zarnke | July 12, 1960 |